(No Model.) 3 Sheets—Sheet 1.
J. R. McPHERSON.
Means for Watering Stock in Cars.
No. 239,526. Patented March 29, 1881.
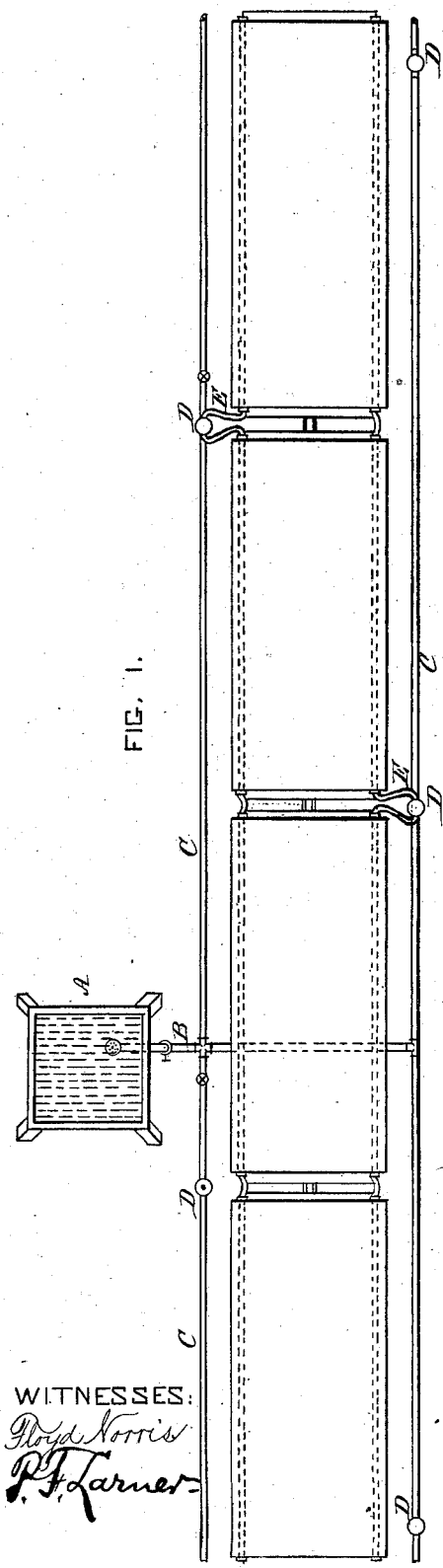
FIG. I.
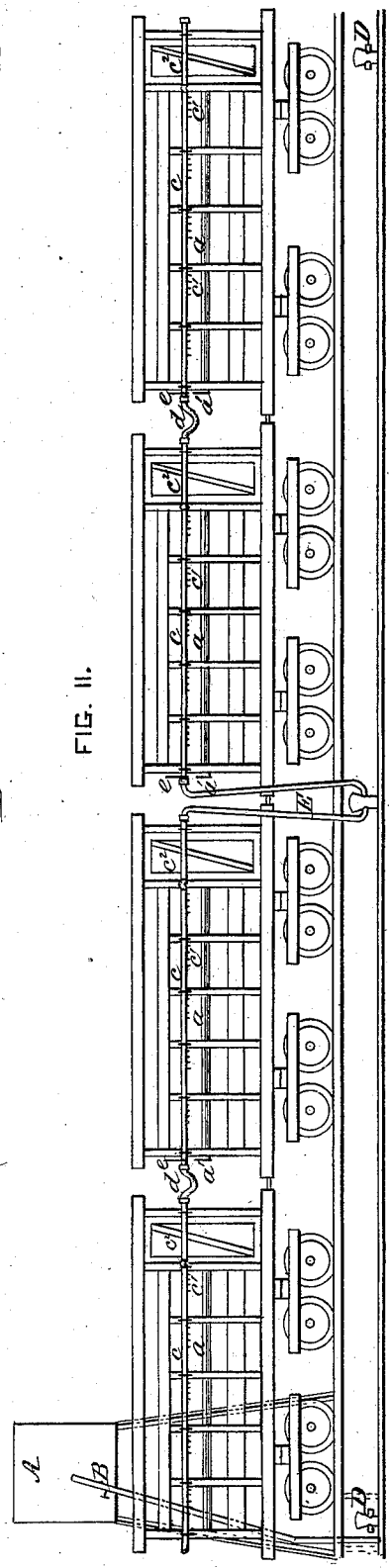
FIG. II.
WITNESSES:
Floyd Norris
P. F. Larner
INVENTOR:
John R. McPherson
by his Attys
Johnson & Johnson (No Model.)  3 Sheets—Sheet 2.
J. R. McPHERSON.
Means for Watering Stock in Cars.
No. 239,526. Patented March 29, 1881.
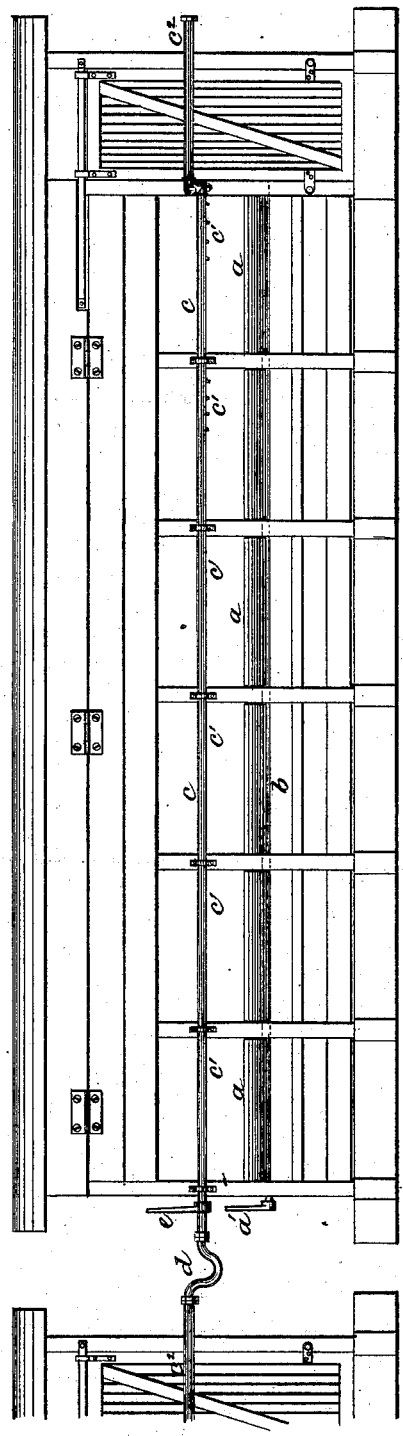
Attest:
Herm. Lauten.
Floyd Norris.
Inventor:
John R. McPherson
by his Attys
Johnson and Johnson (No Model.)    3 Sheets—Sheet 3.
J. R. McPHERSON.
Means for Watering Stock in Cars.
No. 239,526.    Patented March 29, 1881.
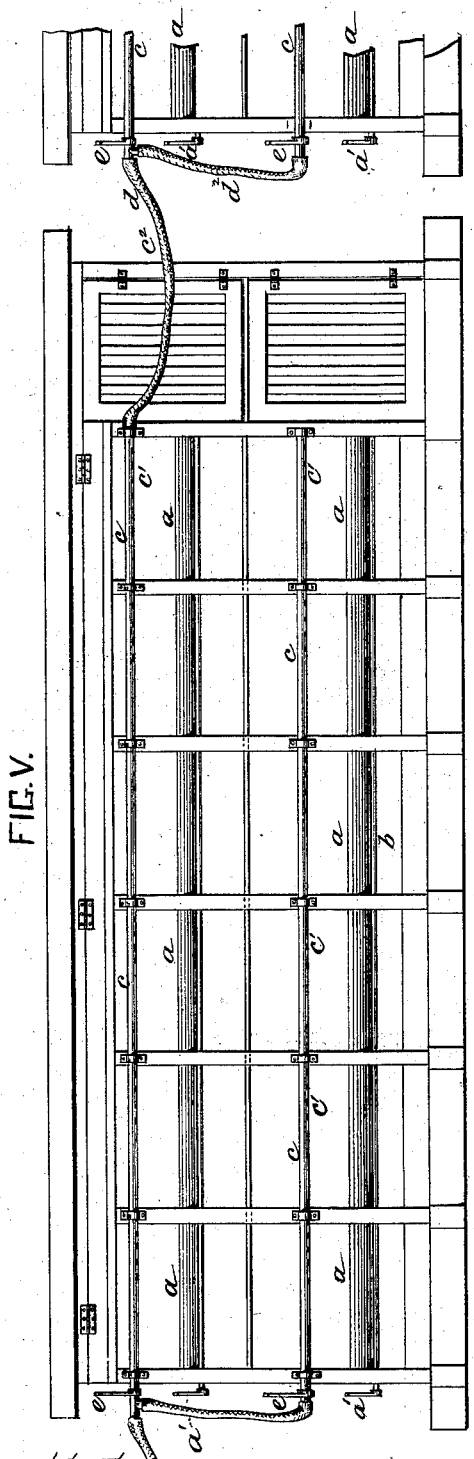
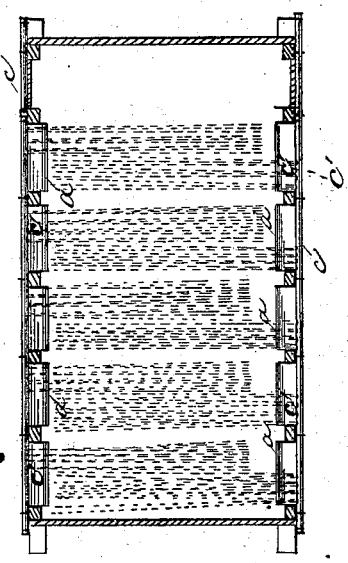
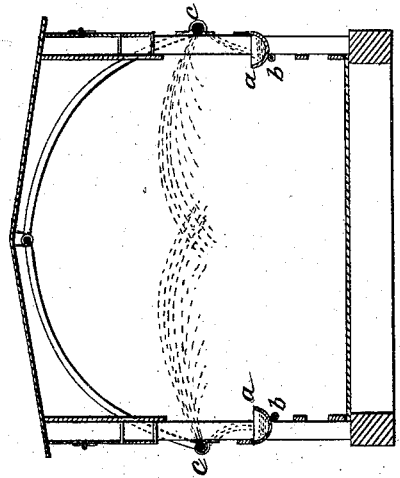
Attest,
W. H. H. Knight
Floyd Norris
Inventor,
John R. McPherson
by his Attys
Johnson and Johnson

UNITED STATES PATENT OFFICE.

JOHN R. McPHERSON, OF SEA BRIGHT, NEW JERSEY.

MEANS FOR WATERING STOCK IN CARS.

SPECIFICATION forming part of Letters Patent No. 239,526, dated March 29, 1881.

Application filed December 1, 1880. (No model.)

*To all whom it may concern:*

Be it known that I, JOHN R. MCPHERSON, a citizen of the United States, residing at Sea Bright, in the county of Monmouth and State of New Jersey, have invented new and useful Improvements in Watering Stock in Cars, of which the following is a specification.

In the transportation of live stock by rail, I propose to water and to cool the animals in the cars by the water-pressure from the stand-tanks or reservoirs erected at stations along the track. In lines of stock-transportation, where such water-pressure can be obtained, I utilize it as the supply and the means of distributing water to the stock or horses throughout the several cars of the train by a suitable system of pipes and hydrants or plugs along the track connected with the stand-tank, and by pipes provided in the cars and adapted for connection with the hydrants for the proper distribution of the water in troughs provided for the purpose. By such system the entire train or a single car may be supplied.

The objects of my improvements are to utilize the pressure of the track stand-tank to supply the stock in the train, to avoid carrying weight in water with the train for this purpose, to economize the cost and weight of pipes for supplying the trains with water and save the cost and weight of supply-tanks for the cars, to effect a saving in labor and time in watering the train, and to reduce the force of hands in the proper attention of these matters. In fact, I reduce the cost in the water-supply appliances and the rolling weight of the train in such matters, and I supply the train with water in a convenient and rapid manner, and in the utilization of the track stand-tank and hydrant-connections for this purpose I make an improvement in the means and method of watering stock carried in cars. The means employed for watering the stock I also employ for sprinkling and cooling the stock in the summer season—that is to say, I use the stand-tank and the pipes for supplying the watering-troughs as the means for directing a shower over and upon the stock from each side of the car. With these facilities for watering the stock are also provided facilities for feeding, as presented in prior patents granted to me.

Referring to the accompanying drawings, Figure I represents a top view of four cars in connection with my new means of watering stock from hydrants connected with the track tank or stand; Fig. II, a side elevation of the same; Fig. III, a side view of a car, on an enlarged scale, showing the perforated supply-pipe and its flexible connection with another car of the train; Fig. IV, a cross-section of a car, showing the relation of the distributing and sprinkling pipes with the drinking and feeding troughs and the food-supply bins; and Fig. V, an elevation of a double-deck car for swine and sheep, showing the double-deck water-supply pipes as arranged for continuous connections in the train. Fig. VI is a horizontal section of a car, showing the showering streams passing each other from opposite sides of the car from the horizontal perforated pipes.

The troughs $a$ are for both food and water, and are arranged in the walls on both sides of the car, preferably in sections, between the wall-studs, and carried by pipes $b$ mounted in bearings in said studs, so that they may be turned in position to feed and water, and when not in use turned outwardly, so that they may occupy as little room within the car as possible. The troughs are of boiler-iron, and are suitably secured to their carrying-pipes and provided with levers $a'$, by which to turn them, as in my patent of September 21, 1875.

For supplying the troughs with water, suitable pipes $c$ are secured along each side of the car over the troughs, and suitably supported and provided with outlets $c'$, so as to direct the water into the troughs, as in a patent owned by me granted to Steventon and McGrath September 21, 1875. These pipes may be arranged on the inner or the outer sides of the car-walls; but they must be so mounted as to allow them to be turned in their bearings in relation to their connections, for a purpose to be presently described.

In cars for cattle and horses the water-distributing pipes are arranged quite high up in the sides, and I provide them at the door-crossings with hinged, jointed, or flexible sections $c^2$, to obtain direct lines of pipes, and adapted to be turned back, either upward, downward, or horizontally out of the way, to allow for ingress or egress. In Figs. III and V such a hinged pipe-section is shown, and the ends of the pipes at each side of the car are provided with suitable couplings for hose-connections $d$ between the cars, so as to make these pipes continuous throughout the train. In such cars the troughs do not cross the doorways.

For small stock the pipes and troughs of both floors of a double-deck car cross the doorways, and the pipe-connections made continuous, as shown in Fig. V, or in any other suitable way.

For cattle and horses the water-supply pipes may cross the doorways above the doors, in which case the jointed sections would be unnecessary, and the pipes would be connected between the car ends, either on a level or at the top of the car; or I may use a hose-coupling crossing the doorway and connecting the cars, and in which case the pipes of both floors may also be connected by a hose-coupling, $d^2$, as shown in Fig. V.

Instead of connecting the side-pipes to render their communication continuous throughout the train, I may arrange a pipe in the top of each car, and by hose-connections between the cars make it continuous throughout the train, and connect such pipe of each car with the side pipes by couplings, which will allow the latter to be turned in their bearings, as shown in Fig. IV.

The conveniences for supplying food may be such as shown and described in my said patents, in which supply-bins are arranged in the side walls with tubes or sluices leading therefrom in positions to discharge the corn or other grain into the troughs and control such distribution. In other matters the cars may be constructed suitably for the transportation of live stock; and having described and shown in such cars provisions for feeding and watering the stock, I will now describe my new method and means of supplying the water under pressure to the entire train.

At watering-stations along the tracks there are supply-stands in elevated positions for supplying the tender-tanks of the locomotive, and it is the pressure of water afforded by these elevated stands that I utilize as the means of watering the entire train. For this purpose the reservoir-stand A should be sufficiently elevated to give the required force or pressure of the water, and leading therefrom a pipe, B, descends and is connected with pipes C C laid under ground along the track, on one or both sides thereof, and of a length sufficient to allow them to be put in communication with the distributing-pipes of a long train. At suitable intervals I provide these track-pipes with hydrants or plugs D, which are provided with one or more hose-couplings, E, which may be always in place for use, or attached when required, and which are fitted with couplings by which to connect them with the car-pipes, thus forming a direct communication of the pipes $c$ of each car with the track stand-tank A, and in this way effect a rush of water to the troughs $a$ provided for the animals to drink while the train is standing. When two track-pipes C are used the hydrants thereof are connected at one or more places with the pipes $c$ on each side of the train, and in a manner to direct the water from one end of the train to the other, or toward both ends of the train by using two hose-couplings with a hydrant.

A single track-pipe may be used with plugs for hose-couplings on each side of the train, and the pipes on one side of the cars may communicate with those on the other, and all supplied from one and the same track-pipe; but I prefer the double track-pipes and double hydrant hose-couplings as giving more efficient and equal distribution of the water to the troughs of each car of the train and at as near the same moment as possible.

In making the hydrant-connections with the car-pipes $c$, the hose-couplings $d$ of the latter are detached at such points for the purpose, and when the stock have been watered are again applied, so as to preserve the continuity of the train-pipes for use at any station on the line.

One car can be watered as well as a train, and by my method an entire train can be watered in about the same time, and with the same labor and expense, required by the plans now in use for watering a single car.

I have stated that the troughs $a$ are supplied with water from horizontal pipes $c$, arranged above the troughs and provided with perforations $c'$ for the purpose, and that these pipes are adapted to be turned in their bearings. The object of adapting these pipes to be so turned is to present their perforations $c'$ inward and upward, so as to project a shower of water from each side of the car over and above the animals, to cool and refresh them in hot weather, as shown in Fig. IV.

As only a few perforations are necessary in the pipes to supply the separate troughs, I make such perforations so as to divide and equalize the streams from each side of the car, so that the same water-supply, the same pressure, and the same pipes for supplying the troughs are utilized for sprinkling and cooling the animals.

The pipes $c$ are provided with hand-levers $e$, by which to turn them in position for sprinkling and for supplying the troughs.

Instead of the separate perforated supply-pipes $c$, I may use the trough-carrying pipes $b$ as the means of supplying the water to said troughs, as in one of my said patents; but the plan shown is much better, while also affording facilities for sprinkling the animals.

The stand-tank is provided with a suitable valved communication with the hydrant-pipes, and the latter may have stop-cocks at suitable intervals, so that only certain portions or the entire lengths of said pipes may be used.

The size of the track-pipes and of the car-pipes should be so regulated that the force of the water-flow will be as nearly as possible identical in each car from the pressure due to the quantity of the water in the stand-tank and its elevation above the cars.

The connections of the distributing-pipes are such as to adapt them for cars having double and single decks in the same train.

It will be understood that the front and rear ends of the distributing-pipes of the front and rear cars must be suitably closed. The track-pipes and the hydrants or plugs should be protected against freezing. The flexible couplings $d$ of the distributing-pipes $c$ can be detached in cold weather to drain them and prevent freezing when not watering.

It is important to notice that a single train-hand can attend to and supply a long train with water in a short time, as the plug-hose may only be connected with the distributing-pipes $c$ of every three or six cars in the train, or a single hydrant will in some cases be sufficient to supply the train, and such hose connections can be quickly made and the water turned on at the same time. In turning the distributing-pipes $c$ in their bearings their continuity throughout the train and with the source of supply is not interrupted, as the flexible couplings, whether coupling the pipes with each other or with the track-plugs, allow said pipes to be so turned independently of each other without affecting their communication with the water-supply. This connecting of independently-turning perforated pipes throughout the train is an important feature of my improvement, inasmuch as by it the same connected car-pipes for supplying water to the troughs are used as the means for sprinkling the stock. It will be understood that only hogs are to be sprinkled, and not cattle, for it is a matter of importance to keep the floors of cattle-cars dry, to prevent the cattle or horses from slipping and falling, and by having the distributing-pipes to turn upon their continuous connections and independently of each other, hog-cars only may be showered, and without interfering with the cattle-cars. It is also important to notice that the couplings $c^2$, which connect the car-pipes across the doorways, can be disconnected at one end only and turned back upon the ends which remain connected, to allow the doors to be opened and closed.

Stock have been watered in cars by a system of pipes leading from an elevated reservoir along the track the length of an ordinary cattle-train, and supplied at convenient distances with branch pipes arranged so as to bring one opposite each car, and other branch pipes are used by the side of the supply-pipes for the purpose of showering the animals. Both these branch pipes are connected with a stand-pipe, and they are both manipulated by hand outside of the car, so as to direct the water through the openings in the car-sides; but to water each car of the train at the same time, and the stock from each side of each car, requires two persons for each car, and to lessen this number of hands must require much more time to water a train. It has also been proposed to water stock in cars from a special water-car by a pump operated from the axle of such car, so as to discharge the water through a hose which connects with and distributes water to different cars. My improvement embraces a different system and new mechanical method, and has advantages not possible in the plans referred to.

I claim—

1. A system of pipes or tubes arranged alongside the track, connected to one or more elevated reservoirs or other pressure force, and provided with hydrants or plugs to which hose or flexible tubes having couplings for attaching them to fixed or turning perforated distributing-pipes arranged on the walls of the cars are connected, all constructed for use substantially as and for the purpose described.

2. As an improvement in means for supplying water to live stock in transit in cars, a pipe or pipes, C, arranged along the track, connected with an elevated tank, A, and having hydrants or plugs D, provided with one or more hose, E, fitted with couplings and adapted to be coupled with distributing-pipes of the car, whereby to effect a direct coupling of the distributing-pipes of one or more cars of the train with the elevated track-tank, substantially as described.

3. In railway-cars for the transportation of live stock, the means, substantially herein described, for showering and cooling the stock, consisting of the perforated distributing-pipes $c\ c'$, upon the walls of the car, adapted to be turned in their bearings and upon their water-supplying connections, whereby to bring their perforations in positions to direct the water downward into troughs, or in positions to direct the water from both sides of the car in a shower over and upon the stock, substantially as described.

4. The perforated water-distributing pipes $c$ of a stock-car, adapted to be turned in their bearings and upon their water-supply connections, substantially as described, and provided with perforations arranged to project the water in alternate cross-showers, so that the streams will pass each other from opposite sides of the car when said pipes are turned in their bearings for such purpose, substantially as described.

5. As an improvement in means for supplying water to live stock in transit in cars, the separate perforated distributing-pipes $c\ c'$ of each car, having their ends projecting beyond the ends of the car, and provided with means whereby to adapt them to be coupled with each other throughout the train by separate flexible couplings, and for connection with hose of hydrants or plugs along the track, substantially as described.

6. The separate water-distributing pipes $c\ c'$ of a car for the transportation of live stock, adapted to be coupled with each other throughout the train by flexible couplings $d$, and to be coupled with hose of hydrants or plugs along the track, the said separate distributing-pipes having flexible or jointed sections $c^2$, crossing the doorways and adapted to be connected with and disconnected at one end only from the continuous piping of the train, and to be turned out of the way upon its connected end, substantially as described.

In testimony whereof I have hereunto set my hand in the presence of two subscribing witnesses.

JOHN R. McPHERSON.

Witnesses:
 A. E. H. JOHNSON,
 J. W. HAMILTON JOHNSON.